United States Patent
Hunt et al.

(10) Patent No.: US 9,720,666 B2
(45) Date of Patent: Aug. 1, 2017

(54) DENSELY STORED STRINGS

(71) Applicant: Oracle International Corporation, Redwood City, CA (US)

(72) Inventors: Charles J. Hunt, Libertyville, IL (US); Aleksey Shipilev, Moscow (RU); Brent A. Christian, Seattle, WA (US); Xueming Shen, San Jose, CA (US); Roger Stephen Riggs, Burlington, CA (US); Vladimir Kozlov, Redwood City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 118 days.

(21) Appl. No.: 14/863,189

(22) Filed: Sep. 23, 2015

(65) Prior Publication Data

US 2017/0083300 A1   Mar. 23, 2017

(51) Int. Cl.
  G06F 17/00 (2006.01)
  G06F 7/00 (2006.01)
  G06F 9/45 (2006.01)
  G06F 12/02 (2006.01)

(52) U.S. Cl.
  CPC ........ *G06F 8/4434* (2013.01); *G06F 12/0223* (2013.01); *G06F 2212/40* (2013.01)

(58) Field of Classification Search
  None
  See application file for complete search history.

(56) References Cited

U.S. PATENT DOCUMENTS

| | | | |
|---|---|---|---|
| 5,929,792 A * | 7/1999 | Herriot ............... | G06F 17/2217 341/55 |
| 6,314,469 B1 * | 11/2001 | Tan ..................... | H04L 61/1511 704/8 |
| 2002/0026616 A1 * | 2/2002 | Kikuchi ............. | G11B 27/3027 714/752 |

(Continued)

OTHER PUBLICATIONS

Mobilefish, "Convert ISO Latin 1, UTF-8, UTF-16, UTF-16LE or Base64 text to hex and vice versa." MobileFish, web.archive.org/web/20140922062543/http://www.mobilefish.com/services/latin_utf_base64_to_hex/latin_utf_base64_to_hex.php.*

*Primary Examiner* — Wei Zhen
*Assistant Examiner* — Binh Luu
(74) *Attorney, Agent, or Firm* — Park, Vaughan, Fleming & Dowler LLP

(57) ABSTRACT

The disclosed embodiments provide a system for densely storing strings within the memory of a software program. During operation, the system receives a set of characters to be stored in a string, wherein each character is encoded using a multi-byte public encoding. The system then stores the set of characters in the string at least in part by performing the following steps. The system determines whether every character of the set can be encoded using a first private encoding that consumes less space per character than the multi-byte public encoding. Responsive to determining that every character of the set can be encoded using the first private encoding, the system stores a particular value associated with the first private encoding in a particular field of the string. The system then stores the set of characters in the string in the first private encoding.

16 Claims, 11 Drawing Sheets

(56) References Cited

U.S. PATENT DOCUMENTS

| | | | | |
|---|---|---|---|---|
| 2002/0078418 | A1* | 6/2002 | Kikuchi | H03M 13/356 |
| | | | | 714/789 |
| 2003/0182128 | A1* | 9/2003 | Kuwata | G06F 17/2217 |
| | | | | 704/270.1 |
| 2006/0242391 | A1* | 10/2006 | Elwood | G06F 9/30149 |
| | | | | 712/238 |
| 2012/0254181 | A1* | 10/2012 | Schofield | G06F 17/2217 |
| | | | | 707/737 |

* cited by examiner

DENSELY STORED STRINGS

BACKGROUND

Field

The disclosed embodiments relate to techniques for reducing the memory requirements of a software program. More specifically, the disclosed embodiments relate to techniques for densely storing strings within the memory of a software program.

Related Art

Software programs create and manage strings to represent words, sentences, and other forms of text. Some programming languages implement strings as objects that encapsulate sequences of characters in a particular character encoding. The string objects may store characters in a two-byte encoding, which may allow software programs to support complex characters. Complex characters are found outside of most Western European languages and may include Cyrillic characters, Hebrew characters, characters found in East Asian languages, and additional characters that are otherwise not supported by single-byte encoding.

However, encoding all characters in multiple bytes may result in larger string objects. This may cause software programs to use significantly more memory if they deal with very long strings and/or numerous strings. Hence, what is needed is a string implementation that both conserves memory and supports complex characters during the execution of a software program.

SUMMARY

The disclosed embodiments provide a system for densely storing strings within the memory of a software program. During operation, the system receives a set of characters to be stored in a string, wherein each character is encoded using a multi-byte public encoding. The system then stores the set of characters in the string at least in part by performing the following steps. The system determines whether every character of the set can be encoded using a first private encoding that consumes less space per character than the multi-byte public encoding. Responsive to determining that every character of the set can be encoded using the first private encoding, the system stores a particular value associated with the first private encoding in a particular field of the string. The system then stores the set of characters in the string in the first private encoding.

Next, responsive to a request for one or more characters stored in the string, the system generates a copy of the one or more characters encoded using the multi-byte public encoding at least in part by performing the following steps. The system determines, from a plurality of procedures associated with a plurality of candidate values for the particular field, a particular procedure associated with the particular value from the particular field. The system then uses the particular procedure to decode the one or more characters from the first private encoding into the multi-byte public encoding.

In some embodiments, a character of the set of characters can be encoded using the first private encoding if the first private encoding includes a code point that represents the character.

In some embodiments, the set of characters are stored in a byte array field of the string and the particular field is a byte field.

In some embodiments, storing the set of characters in the string further includes the following steps. Responsive to determining that at least one of the characters of the set cannot be encoded using the first private encoding, the system stores a particular value associated with a second private encoding in the particular field. The system then stores the set of characters in the string in the second private encoding.

In some embodiments, a character that is encoded in the multi-byte public encoding is represented by a plurality of bytes, a character that is encoded in the first private encoding is represented by at most a single byte, and a character that is encoded in the second private encoding is represented by a plurality of bytes.

In some embodiments, the particular value assigned to the byte field maps to a static object representation of the first private encoding and the static object representation provides the particular procedure.

In some embodiments, the request for the one or more characters stored in the string includes at least one of:
(i) retrieving the one or more characters from the string as one or more chars;
(ii) concatenating the string with another string to form a new string;
(iii) obtaining a substring from the string; and
(iv) replacing one or more other characters in the string to form a new string.

In some embodiments, determining whether the string is equal to another string includes determining that the string is not equal to the other string based at least in part on determining that the particular field of the string and the particular field of the other string are not equal prior to comparing the byte array field of the string to the byte array field of the other string.

In some embodiments, determining whether the string matches an expression includes determining that the string does not match the expression based at least in part on determining that the expression includes a character that cannot be encoded using the private encoding associated with the particular value stored in the particular field of the string prior to determining whether the byte array field matches the expression.

In some embodiments, the multi-byte public encoding is UTF-16 and the first and second private encodings include at least one of UTF-8, UTF-16, UTF-32, and Latin-1.

As described herein, first, second, third, and other ordinal adjectives are naming conventions that are not necessarily indicative of order unless otherwise functionally required.

BRIEF DESCRIPTION OF THE FIGURES

In the figures, like reference numerals refer to the same figure elements.

DETAILED DESCRIPTION

Figure 1:
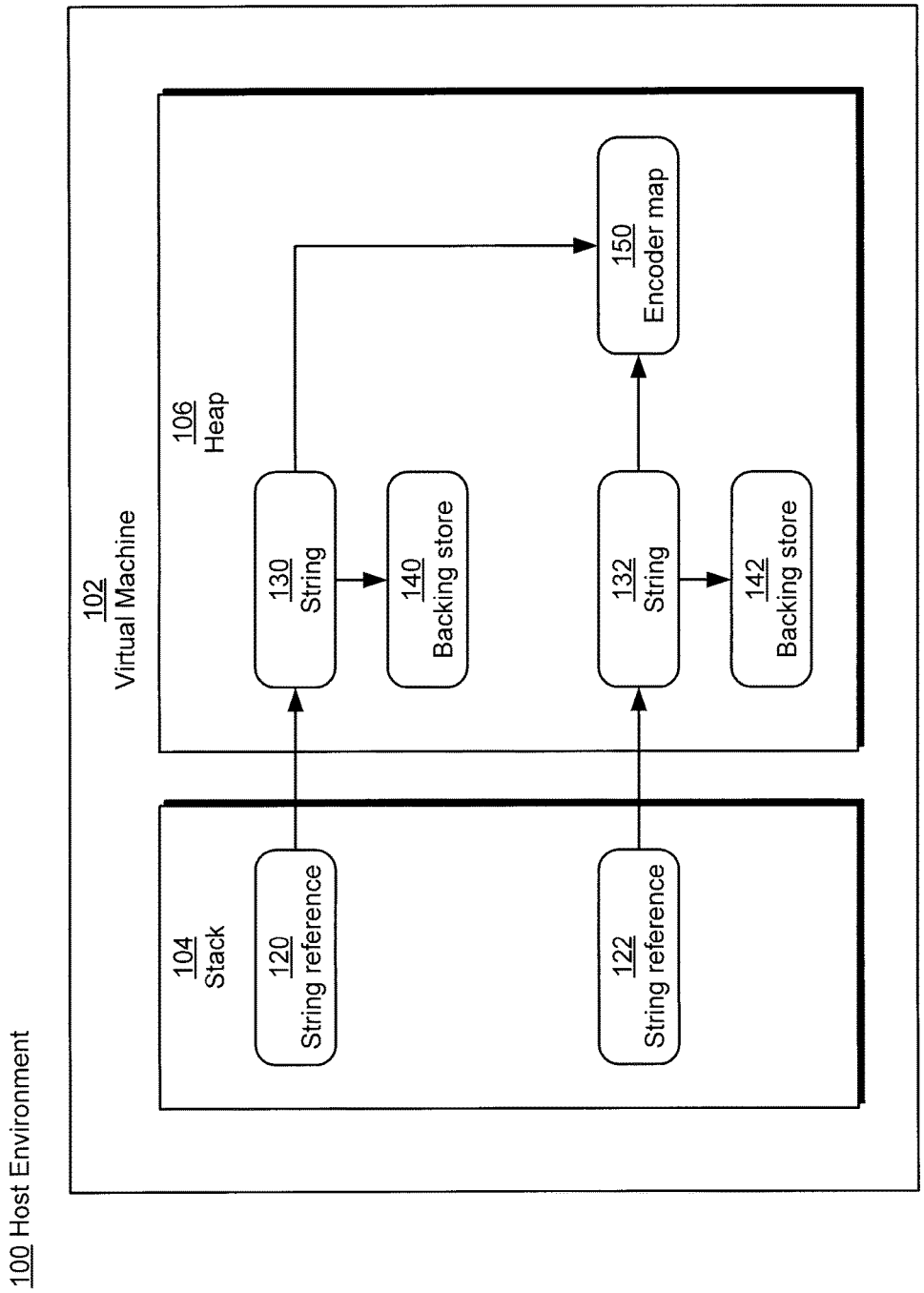
FIG. 1 shows a diagram of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method and system for densely storing strings in memory during the execution of a software program. During the creation of a densely stored string, a sequence of characters (i.e., the input characters) may be passed to a string object constructor. The sequence of characters is then stored within the string in an encoding that uses fewer bytes to adequately represent each of the characters. The software program may then use this string to store, manage, and/or display the sequence of characters.

More specifically, the disclosed embodiments provide a string implementation that supports complex characters (i.e., characters that are only supported by multi-byte encodings) while reducing the number of bytes used to represent characters within the string. Because strings are often abundant within software programs, the disclosed embodiments may (1) significantly reduce the amount of heap memory used by software programs; and (2) increase throughput performance of software programs due to improved central processing unit (CPU) cache utilization that results from string objects using less memory. Additionally, because most strings are composed solely of simple characters (i.e., characters that are supported by single-byte encodings), the disclosed embodiments may reduce the memory footprint of one or more strings by close to half. These advantages may be especially pronounced in software programs that deal with very long strings and/or numerous strings.

Irrespective of how characters are stored within strings, the public interface provided by the string class to string consumers may largely deal with multi-byte encoded characters. For example, characters passed to and/or retrieved from a string object may largely be characters encoded in UTF-16 (a two-byte encoding), which allows the software program to support complex characters. If a string is composed of only simple characters, however, the extra bytes beyond the first byte that are used to represent each character are wasted. To reduce wasted memory, the string implementation may use a single-byte encoding (e.g. Latin-1) to store the string's characters. These strings may be referred to as "skinny strings." However, if a string includes at least one complex character, the string implementation may leave the string's characters in the multi-byte encoding to avoid the loss of information. Irrespective of whether the string stores characters in the single-byte encoding or the multi-byte encoding, consumers of the string that invoke the string's public interface may only encounter the string's characters encoded in the multi-byte encoding. For example, when extracting one or more characters from a skinny string, the string implementation may transcode (i.e., decode) the string's characters from the single-byte encoding to the multi-byte encoding and presenting the transcoded characters to a string consumer.

The separation between how a string stores characters and how a string represents characters in its public interface may be clarified with the terms "public encoding" and "private encoding." A public encoding may refer to the character encoding in which the char data type of the software program's programming language is encoded in by default. In other words, methods of the software program that accept a character as a parameter generally assume the character to be encoded in the public encoding, unless otherwise specified. Likewise, methods of the software program that return a character may return the character encoded in the public encoding. In general, a software program may use a single public encoding, which may free classes and methods from having to deal with multiple character encodings, thereby reducing the complexity of software program. For example, the public encoding used by a Java (Java™ is a registered trademark of Oracle America, Inc.) program may be UTF-16. Thus, classes and methods of the Java program that interact with characters may generally interact with UTF-16 encoded characters. It should be noted that a software program may use any character encoding as its public encoding. For example, if the software program is designed to execute on memory-constrained computing devices, the software program may use a single-byte encoding as its public encoding. In some cases, the public encoding for a software programming may be specified by a user of the software program.

A private encoding may refer to the character encoding a string has chosen to encode its characters in. In some embodiments, the string may not reveal to its consumers which private encoding it has chosen. The string may also choose its private encoding from a number of character encodings depending on the characters it stores. For example, if a string only includes simple characters, the string may choose Latin-1 as its private encoding. If the string includes one or more complex characters, the string may choose UTF-16 as its private encoding. Regardless of which private encoding is chosen by the string, the string's public interface may accept and return only characters encoded in the public encoding. It should be noted that a software program may provide any number of character encodings for a string to choose its private encoding from. In some embodiments, the set of character encodings provided to strings may be specified by a user of the software program.

In some embodiments, the private encoding chosen by a string may be identical to the software program's public encoding. For example, a software program written in Java may have UTF-16 as its public encoding. If the software program creates a string with a complex character, the string may choose UTF-16 to be its private encoding. In other cases however, a string's private encoding may be different from the public encoding. This separation between the public encoding and a string's chosen private encoding may provide memory savings and/or flexibility in how strings may operate within a software program.

Some embodiments may delay the choosing of a string's private encoding until the string's construction during the execution of the software program. This may be advantageous over an approach where a user of the software program is forced to specify a single character encoding for all strings in the software program prior to its execution (i.e., an all-or-nothing approach). The all-or-nothing approach would force the user to choose between (1) a single-byte encoding to conserve memory; and (2) a multi-byte encoding to support complex-characters. In contrast, deferring the choice of which character encoding to use until string construction time would enable the software program to use multiple character encodings and simultaneously conserve memory while supporting complex characters during the execution of the software program.

Some embodiments may provide a string implementation that involves (1) using an encoding-agnostic sequence of bytes as the string's backing store; and (2) providing, to the string, one or more encoding abstractions, referred to as encoders, capable of interpreting the sequence of bytes into a meaningful sequence of characters. The conceptual separation between the sequence of bytes and encoders may be advantageous because it allows a string to store, within a single byte array, characters in any character encoding, wherein the string may use one of the encoders to decode the byte array into meaningful characters. This string implementation may be less complex and less resource-intensive than an approach that uses different arrays for different character encodings (e.g., using a byte array when the string contains only simple characters and a char array when the string contains at least one complex character). Additionally, the separation may facilitate the use of additional character encodings within backing stores. For example, to enable strings to store characters in Latin-1, UTF-16, and/or UTF-8, the string implementation may provide all strings with a Latin-1 encoder, a UTF-16 encoder, and a UTF-8 encoder. To add support for storing characters in yet another encoding, a user/developer of the software program may provide another encoder for that encoding. As a result, the choice of character encodings available to a string to transcode its characters into is only limited by the encoders provided to it.

Additionally, the string implementation may place the encoders within a static map that is shareable amongst all strings. The static object may correspond to a mapping that associates each encoder with an encoding identifier that corresponds to a primitive data type (e.g., a byte value). Then, to specify which character encoding is being used, a string may set a member field to the encoding identifier. The string implementation may use static dispatch to interpret a string's backing store, which involves plugging a string's encoding identifier into the map to call the decoding procedure associated with the string's encoding identifier. Static dispatch may provide advantages over a purely object-oriented approach, which may involve (1) creating an interface common to all encoders, (2) creating, for each encoder, an implementation for the interface, and (3) assigning, to each string, an encoder instance that corresponds to one of the implementations, wherein (4) a virtual table lookup may be required each time a string's backing store is to be interpreted. These advantages may include (1) strings using less memory due to the inclusion of a byte value rather than an encoder instance; and (2) a reduction of virtual table lookups, which may be computationally expensive.

Furthermore, a string may use its encoding identifier to expedite certain string-based operations. For example, determining whether a first string and a second string are equal may involve comparing characters contained in both strings. This comparison may be skipped if it is determined that the first and second strings have set different encoding identifiers. In another example, determining whether a string matches a regular expression may involve comparing characters contained in the string with those of the regular expression. This comparison may be skipped if it is determined that the regular expression includes a character that is not supported by the string's encoding.

FIG. 1 shows a diagram of a system in accordance with the disclosed embodiments. As shown in FIG. 1, a software program executes on virtual machine 102, which is contained in host environment 100. More specifically, the software program may create strings 130-132 to store, manage, and/or display sequences of characters while executing on virtual machine 102.

Host environment 100 may correspond to a stack of one or more software components that run on computing hardware, which may correspond to a smartphone, a cell phone, a personal digital assistant (PDA), a laptop computer, a desktop computer, a tablet computer, a server, a cluster of servers, a hypervisor, a container, or an embedded system. In some embodiments, the software program may execute directly on the computing hardware. In some other embodiments, the software program may be an application that executes on an operating system, an embedded application that executes directly on firmware, an enterprise application, a database, a shared library, a device driver, and/or any other type of software program. The software program may be written in a high-level programming language that can be compiled into an intermediate code via a compiler. Additionally, the software program, in its intermediate code form, may be configured to execute on virtual machine 102. For example, the software program may be written in the Java programming language; virtual machine 102 may be a Java Virtual Machine (JVM); and the software program may be compiled into Java byte code, which may be executed on any software environment that includes a JVM. Furthermore, the software program may include logic that (1) creates a first sequence of characters on stack 104, (2) instantiates string 130 from the first sequence of characters (e.g., a char array or a string literal), (3) assigns a reference to string 130 to string reference 120, (4) creates a second sequence of characters on stack 104, (5) instantiates string 132 from the second sequence of characters, and (6) assigns a reference to string 132 to string reference 122. It should be noted that in some embodiments, the software program may be written in a high-level programming language that compiles into machine code, which may be executed on the computing hardware without the assistance of virtual machine 102.

Virtual machine 102 may correspond to any virtual machine that provides an encoder and/or a just-in-time (JIT) compiler for executing the software program in its intermediate code form. Memory provided by virtual machine 102 for executing the software program may include stack 104 and heap 106.

Stack 104 may correspond to a portion of memory provided by virtual machine 102 that is used to store one or more stack frames, which may each store the context associated with a particular method invocation. In particular, a stack frame may contain one or more temporary variables that are created during the execution of a method. The variables may include variables that store primitive types (e.g., boolean, byte, int, char, etc.). The variables may further include reference variables that refer to other variables, objects, and/or arrays. During the execution of the software program, string references 120-122 may reside in one or more stack frames on stack 104.

Heap 106 may correspond to a portion of memory provided by virtual machine 102 for dynamic memory allocation. In particular, arrays, objects, and other complex data types that are created during the software program's execution may reside on heap 106. Arrays residing on heap 106 may include byte arrays and character arrays. Objects residing on heap 106 may include (1) instances of a class type, such as a string object (i.e., a string); and (2) static objects (e.g., classes with members that are all declared to be static). In particular, strings 130-132, backing stores 140-142, and encoder map 150 may all reside in heap 106. It should be noted that because the memory provided by heap 106 is a finite resource, it may be advantageous to reduce the software program's footprint by densely storing strings created by the software program.

String references 120-122 may each correspond to a reference variable that resides on stack 104. String reference 120 may contain the address of string 130 on heap 106. String reference 122 may contain the address of string 132 on heap 106.

Strings 130-132 may each correspond to a string. A string may be an object that encapsulates a sequence of characters. Each string may be instantiated from a class that is provided by a programming language's standard library (e.g., the java.lang.String class, provided by the Java Class Library). Each string may contain (1) one or more static fields (i.e., fields that belong to the class rather than the instance, wherein all instances of the class access the same static field variables) that include a reference to encoder map 150, (2) one or more non-static fields (i.e., fields that belong to the instance rather than the class, wherein non-static fields contain different variables for every instance of the class) that include the string's encoding identifier and a reference to the string's backing store, and (3) one or more exposed methods (i.e., public methods) that may be invoked by string consumers to interact with the sequence of characters encapsulated by the string. In particular, string 130 may contain references to backing store 140 and encoder map 150 while string 132 may contain references to backing store 142 and encoder map 150.

Backing stores 140-142 may each correspond to a data structure used by a string to store a sequence of characters in a particular character encoding. While the data structure is usually an array, any data structure suitable for holding a sequence of bytes (e.g., a linked-list) may be employed. In embodiments where the data structure is an array, an array that is encoding-agnostic, such as a byte array, may be preferred so that the string may store characters in any encoding within its backing store. Then, the string may rely on an encoder retrieved from encoder map 150 to interpret the bytes stored within the backing store.

As shown in FIG. 1, strings 130-132 may both have a static field that refers to the same encoder map (i.e., encoder map 150). Encoder map 150 may correspond to a static field, a global object, or some other associative data structure capable of (1) storing a set of encoders for sharing amongst strings; and (2) associating each encoder with an encoding identifier. Encoder map 150 may use encoding identifiers as keys to access the encoders it has stored, wherein each encoding identifier is a unique byte value that is associated with a particular encoder. Each encoder may be associated with a particular character encoding and may expose one or more methods to strings, thereby allowing a string to interact with its encoding-agnostic backing store. To interact with its backing store, the string may perform a static dispatch by (1) using its encoding identifier to select an encoder from encoder map 150; and (2) invoking a method provided by the encoder. For example, encoder map 150 may include a Latin-1 encoder that may be used by strings that contain only simple characters, and a UTF-16 encoder that may be used by strings that include at least one complex character.

Figure 2:
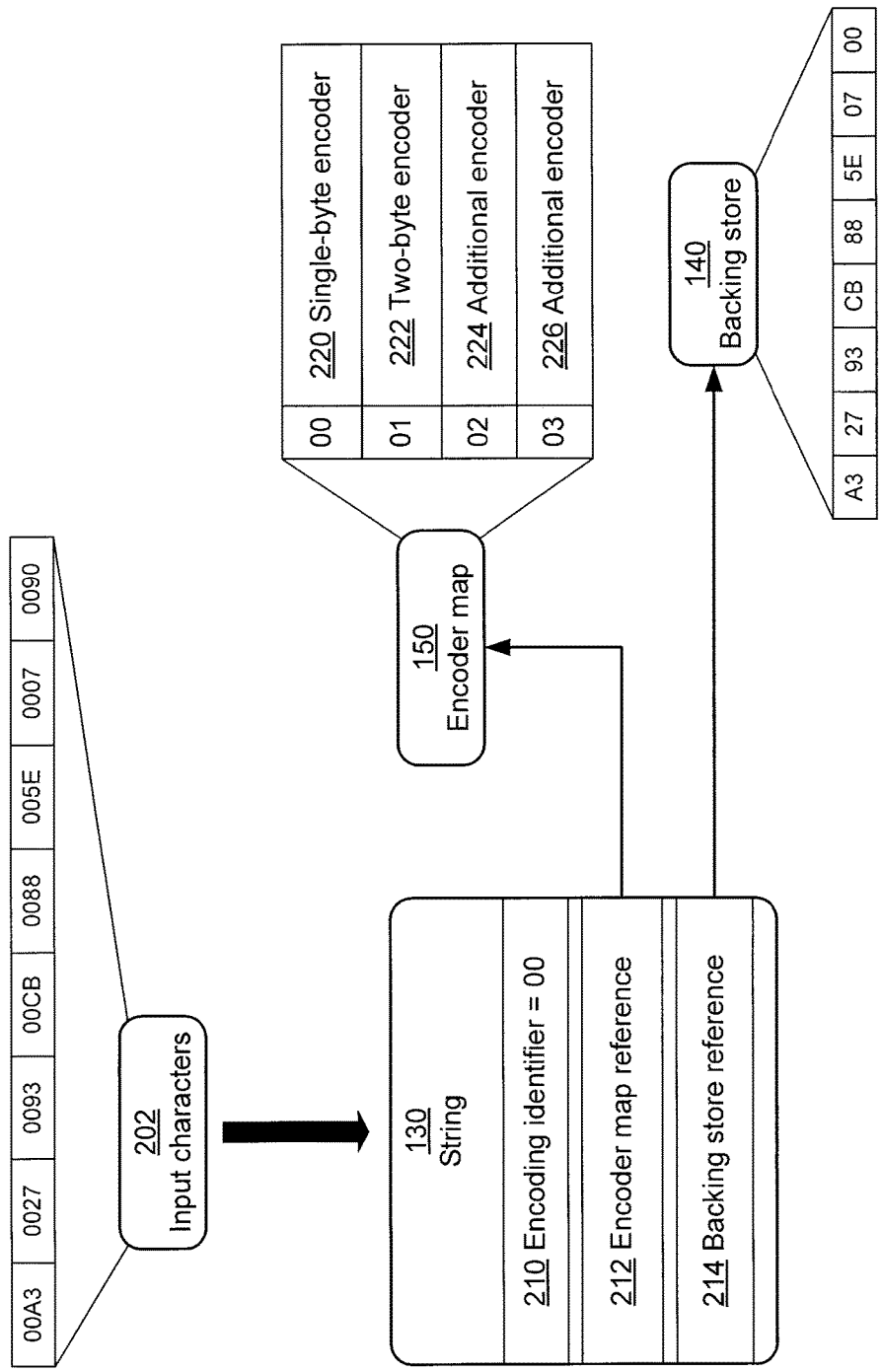
FIG. 2 shows the storing of characters in a string in accordance with the disclosed embodiments.

FIG. 2 shows a diagram of a system that focuses on the storing of simple characters in a string. More specifically, FIG. 2 discloses how input characters 202, which includes simple characters encoded in a public encoding, are stored in string 130. Input characters 202 may be transcoded into a private encoding that differs from the public encoding, wherein the transcoded characters are stored in backing store 140.

Input characters 202 may be stored in a char array, a string literal, or any data structure capable of storing a sequence of bytes. For example, input characters 202 may include eight characters encoded in UTF-16 that are stored in a char array that was created on stack 104. Each of the eight boxes of input characters 202 contains a four-digit hexadecimal number, which is the code point for a UTF-16 encoded character. In particular, the code point of the first character in input characters 202 may correspond to the value 0x00A3. It should be noted that the first two digits of 0x00A3 are '0', which means that the first character may be a simple character that requires only two hexadecimal digits (i.e., a single byte) for representation.

The discussion below relates to how character encodings are used by software programs to digitally store characters from human languages. A character encoding may be associated with a coded character set. A coded character set corresponds to a set of characters, wherein each character in the set is assigned a code point (i.e., a unique number). A character encoding that supports the coded character set is capable of encoding all characters within the coded character set into a code unit (i.e., a unique bit sequence used to encode a code point or a character). For example, Unicode, which is a coded character set, assigns a code point to characters found in most of the world's writing systems. UTF-8, UTF-16, and UTF-32, which are character encodings, support Unicode by mapping each of its code points to a code unit. Other character encodings, such as US-ASCII and Latin-1 may not support Unicode because (1) both US-ASCII and Latin-1 are single-byte encodings; and (2) Unicode contains a repertoire of more than 120,000 characters. There are not enough unique bit sequences in a single byte to support 120,000 characters.

It should be noted that some character encoding may be variable-length. For example, UTF-8 may use between one and four bytes to encode a code point depending on the code points position in Unicode's repertoire of characters. Additionally UTF-16 may use either two or four bytes to encode a code point.

Each character encoding may have advantages and/or disadvantages. Because Latin-1 uses a single byte to encode a character, characters encoded in Latin-1 take up less memory than characters encoded in UTF-16, which uses at least two bytes to encode a character. However, the set of characters/languages supported by UTF-16 exceeds that which is supported by Latin-1. Thus, the disclosed embodiments may allow the software program to benefit from the advantages of multiple character encodings while minimizing their drawbacks.

As shown in FIG. 2, the software program may construct string 130 using input characters 202. String 130 may contain several member fields which include encoding identifier 210, encoder map reference 212, and backing store reference 214. Encoding identifier 210 may correspond to a byte field that stores a byte value, which may be used as a key to select an encoder from encoder map 150. Encoding identifier 210 may be set when the string's character encoding is determined during the string's construction. For example, encoding identifier 210 may be set to 0x00, which corresponds to single-byte encoder 220 in encoder map 150. Encoder map reference 212 may correspond to a static field that holds a reference to encoder map 150. In some embodiments, encoder map 150 may include an encoder for each character encoding that is available to strings. Backing store reference 214 may correspond to a member field that holds a reference to backing store 140.

Backing store 140 may correspond to a byte array that acts as a backing store for string 130. During the construction of string 130, the constructor may store input characters 202 in the backing store 140. Unlike input characters 202, which may span 16 bytes (two bytes for each of the eight chars), backing store 140 may span only eight bytes (one byte for each of the eight bytes). However, backing store 140 may still store all the code points of input characters 202 without loss of information. More specifically, input characters 202 may contain the following UTF-16 code units: 0x00A3, 0x0027, 0x0093, 0x00CB, 0x0088, 0x005E, 0x0007, and 0x0090. It should be noted that the left two hexadecimal digits of each of the eight code units are zero, which means that the leftmost (i.e., second) byte of each code unit is not needed to represent its code point. This is because all eight characters are simple characters. Backing store 140, in contrast, uses only one byte to store each of the eight characters without loss of information. In some embodiments, the characters stored in backing store 140 may be encoded in Latin-1. To transcode each of the characters from UTF-16 to Latin-1, the string constructor may copy the rightmost (i.e., first) byte of each character in UTF-16 to a single byte entry in backing store 140. Since all of the eight characters are simple characters, backing store 140 may store each character in one byte without loss of information.

Encoder map 150 may correspond to a map that stores encoders as values and uses byte values as keys that identify the encoders. In particular, encoder map 150 may store single-byte encoder 220 in an entry identified by the key 0x00, two-byte encoder 222 in an entry identified by the key 0x01, and additional encoders 224-226 in entries identified by keys 0x02 and 0x03 respectively. In some embodiments, encoder map 150 may contain more or fewer encoders. In some embodiments, the encoders may be instantiated from a set of static classes that share an interface. The interface may include one or more methods that are exposed to strings. In particular, the interface shared between the static classes may include an encode method used to transcode characters from the public encoding into a private encoding, and a decode method used to transcode characters from the private encoding back into the public encoding. It should be noted that static classes may (1) contain only static methods; and (2) not hold any state. Thus, the encoders may be shared amongst the strings without unnecessary duplication.

Constructing string 130 may involve one or more steps. After the creation of input characters 202 on stack 104, the input characters are passed to string 130's constructor. The constructor inspects each of the characters to determine whether all of the characters are simple characters or whether at least one of the characters is a complex character. For example, the constructor may examine the two-byte code unit of a character to determine whether the leftmost byte of the code unit is equal to 0x00. The string constructor may determine that string 130 can use a single-byte encoding (e.g., Latin-1) because input characters 202 contain only simple characters. Next, the string constructor sets encoding identifier 210 to 0x00, which is the byte value that corresponds to single-byte encoder 220. Next, the string constructor allocates, for backing store 140, an eight-byte array and sets backing store reference 214 to refer to the byte array. To transcode input characters 202 into Latin-1, the string constructor performs a static dispatch to the encoding method that corresponds to encoding identifier 210. More specifically, the string constructor retrieves, from encoder map 150, the encoder that corresponds to the byte value 0x00, single-byte encoder 220. The string constructor may call single-byte encoder 220's encode method, passing in input characters 202 as a parameter. In some embodiments, a typecast may be performed on single-byte encoder 220. Next, the encode method transcodes the input characters into Latin-1 and returns the Latin-1 characters to the string constructor. The string constructor then places the Latin-1 characters in backing store 140.

Figure 3:
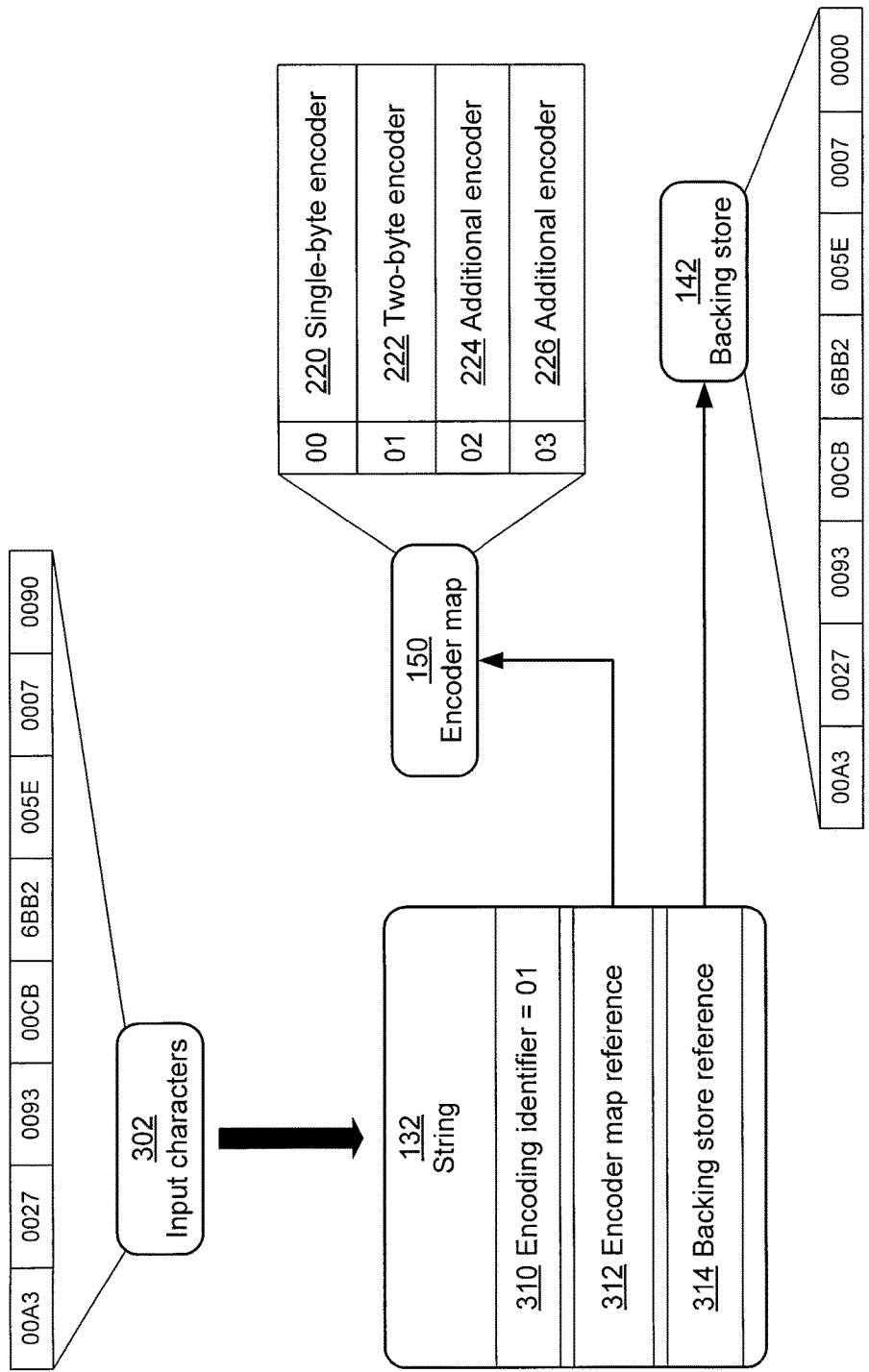
FIG. 3 shows the storing of characters in a string in accordance with the disclosed embodiments.

FIG. 3 shows a diagram of a system that focuses on the storing of complex characters in a string. More specifically, FIG. 3 discloses how input characters 302, which includes a combination of simple characters and complex characters encoded in a public encoding, is stored in string 132. In some embodiments, input characters 302 may not be transcoded before being stored in backing store 142. While memory may not be conserved in the example disclosed in FIG. 3, FIG. 3 illustrates how the disclosed embodiments provide support for complex characters when necessary.

Constructing string 132 using input characters 302 may involve one or more steps. After the creation of input characters 302 on stack 104, the input characters are passed to string 132's constructor. The constructor inspects each of the characters to determine whether all of the characters are simple characters or whether at least one of the characters is a complex character. Next, the string constructor may determine that the fifth character is a complex character because the leftmost byte of the two-byte value 0x6BB2 is nonzero. Thus, the fifth character is a complex character and cannot be encoded in Latin-1 without loss of information. As a result, the string constructor then resorts to using a two-byte character encoding as the private encoding for storing input characters 302. Thus, the string constructor sets encoding identifier 310 to 0x01, which is the byte value that corresponds to two-byte encoder 222. Next, the string constructor allocates, for backing store 142, a 16-byte array and sets backing store reference 314 to refer to the byte array.

The constructor may then determine whether the private encoding is the same as the public encoding. If they are not the same, the constructor performs a static dispatch to the encoding method that corresponds to encoding identifier 310. More specifically, the string constructor retrieves, from encoder map 150, the encoder that corresponds to byte value 0x01, two-byte encoder 222. The string constructor may call two-byte encoder 222's encode method, passing in input characters 302 as a parameter. Next, the encode method transcodes the input characters into the selected private encoding and returns the transcoded characters to the string constructor.

Alternatively, if the selected private encoding is the same as the public encoding, the string constructor may omit the step of performing the static dispatch and store the input characters in backing store 142 without transcoding them.

Figure 4:
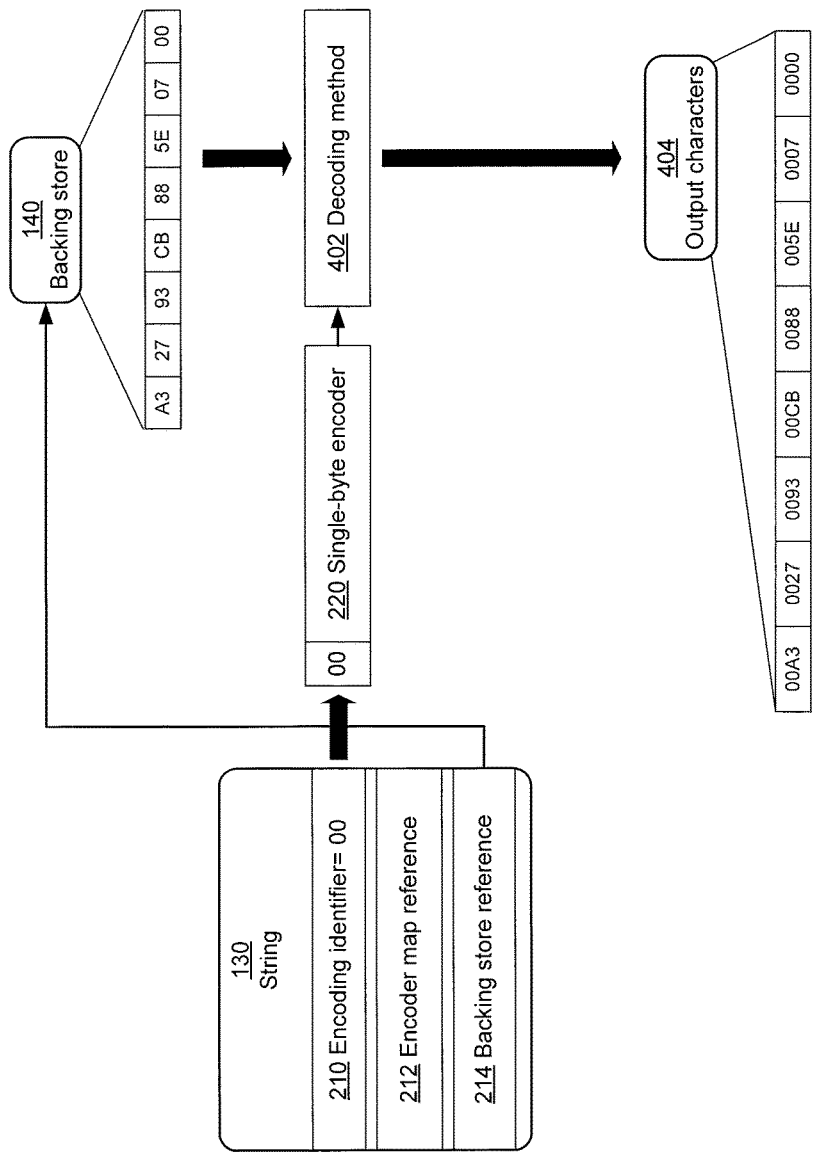
FIG. 4 shows the extraction of characters from a string in accordance with the disclosed embodiments.

FIG. 4 shows a diagram of a system that focuses on the extraction of characters from a string. As can be seen in FIG. 4, string 130 may encapsulate a sequence of eight simple characters, which is stored in backing store 140 in Latin-1. During the execution of the software program, a string consumer may invoke a public method (i.e., a procedure) exposed by the string class to extract one or more characters in backing store 140. For example, the string consumer may invoke the getChars method to obtain the eight characters in the form of an array.

Extracting the characters from string 130 may involve one or more steps. After the method is invoked by the string consumer, the method performs a static dispatch to the decode method that corresponds to encoding identifier 210. More specifically, the method retrieves, from encoder map 150, the encoder that corresponds to encoding identifier 210, which is single-byte encoder 220. The string constructor may then call decode method 402, passing in the characters stored in backing store 140 as a parameter. Next, decode method 402 transcodes the characters from the private encoding (e.g., Latin-1) into the public encoding (e.g., UTF-16). The method then returns transcoded characters to the consumer as output characters 404. It should be noted that in cases where the private encoding and the public encoding are the same, the step of transcoding the characters from the private encoding to the public encoding may be omitted. By ensuring that string-encapsulated characters are encoded in the public encoding when extracted from the string, the disclosed embodiments may allow string consumers to assume that characters are always encoded in the public encoding, which reduces the complexity of the string consumers.

Figure 5:
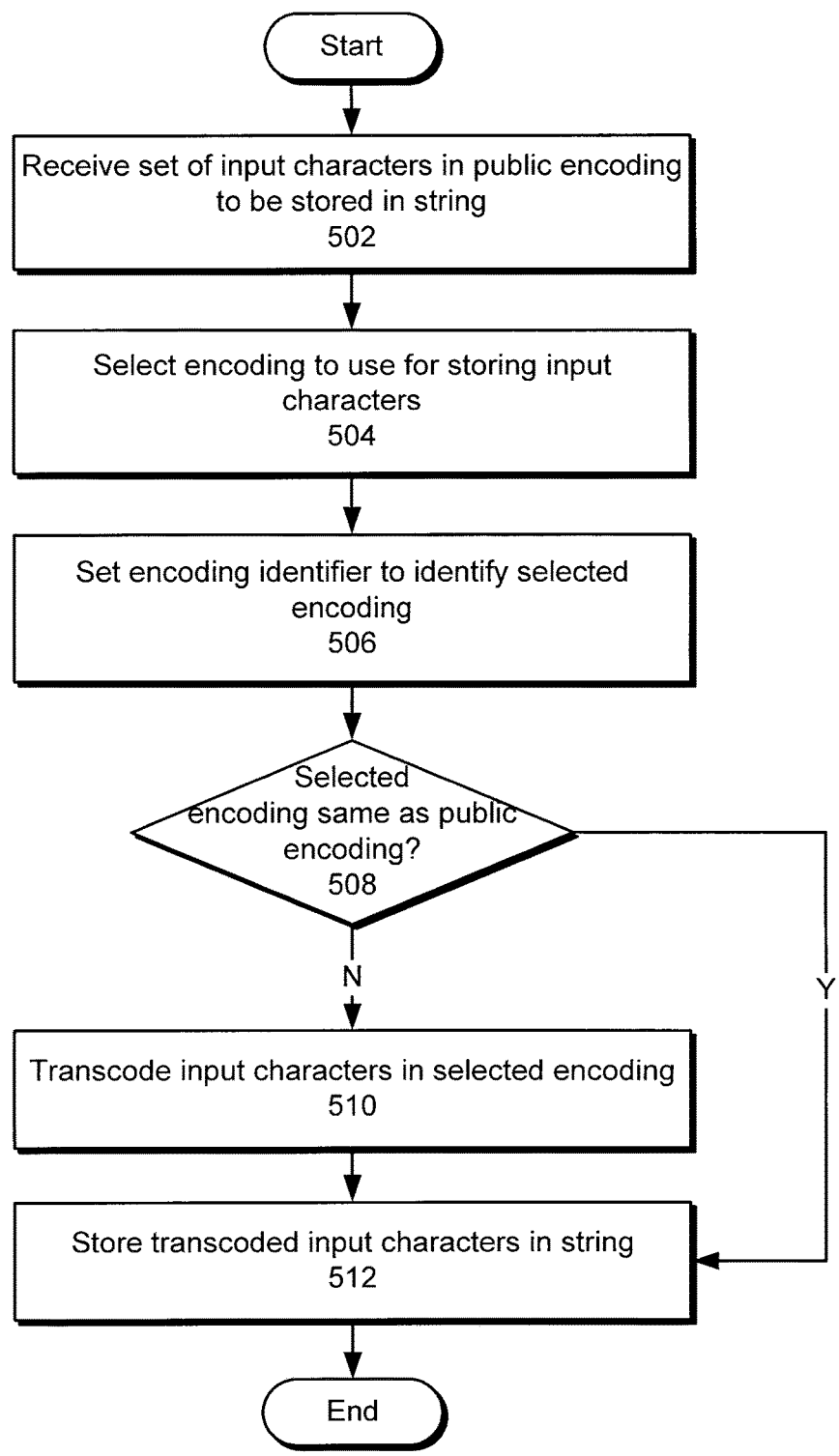
FIG. 5 shows a flowchart illustrating an exemplary process of the storing of characters in a string in accordance with the disclosed embodiments.

FIG. 5 shows a flowchart illustrating an exemplary process of storing characters in a string in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

Storing characters within a string may involve several steps. The software program may instantiate a string by providing a sequence of characters to the string's constructor (operation 502). For example, the software program may create a string by passing the following sequence of characters: 'q', 'w', 'e', 'r', 't', and 'y' to the string's constructor. Next, the string constructor selects a private encoding (operation 504). For example, because all of the characters in the character sequence "qwerty" are simple characters, the Latin-1 encoding is selected. More details on selecting the private encoding are provided in FIG. 6. After the encoding is selected, the string constructor sets the encoding identifier to a byte value that corresponds to the selected private encoding (operation 506). For example, the encoding identifier may be set to 0x00. If the private encoding is different from the public encoding (decision 508), the string constructor encodes the input characters into the private encoding (operation 510). If the private encoding is the same as the public encoding (decision 508), the encoding step is skipped. For example, because Latin-1 is different from UTF-16, the string constructor invokes the encode method of the Latin-1 encoder, which results in the character sequence "qwerty" being transcoded from UTF-16 to Latin-1. The string constructor then stores the transcoded input characters in the string's backing store (512). For example, the character sequence "qwerty," which is encoded in Latin-1, is stored in the string's backing store.

In some embodiments, the string class may provide a string constructor capable of accepting characters in different encodings. If a string constructor receives characters in an encoding that is identical to the selected encoding, the string constructor may omit the step of transcoding the characters. For example, if a string constructor receives a sequence of simple characters that are encoded in Latin-1, the string constructor may not need to transcode the sequence of characters because (1) the string's private encoding would be set to Latin-1; and (2) the sequence of characters is already encoded in Latin-1.

Figure 6:
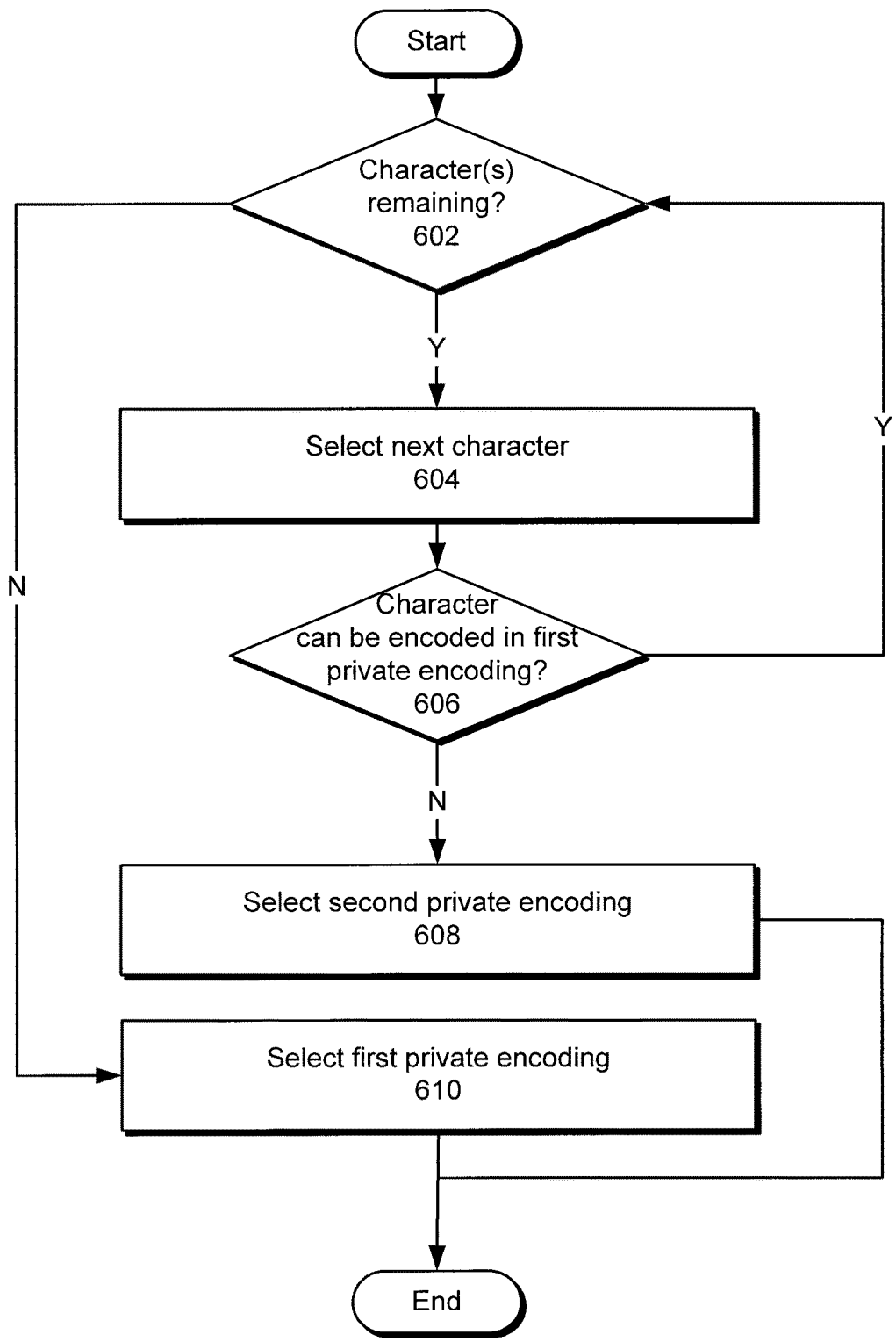
FIG. 6 shows a flowchart illustrating an exemplary process of selecting an encoding in accordance with the disclosed embodiments.

FIG. 6 shows a flowchart illustrating an exemplary process of selecting a private encoding in accordance with the disclosed embodiments. In one or more embodiments, one or more of the steps may be omitted, repeated, and/or performed in a different order. Accordingly, the specific arrangement of steps shown in FIG. 6 should not be construed as limiting the scope of the embodiments.

Selecting the private encoding to encode a sequence of characters for a new string may involve several steps. Once the sequence of characters is received, the string constructor may inspect each character in the sequence. If a character has not yet been inspected in the sequence (decision 602), the string constructor may select the character (operation 604) and determine whether the character can be encoded in a first private encoding (decision 606). For example, a string constructor that receives the character sequence "qwerty" may select the first character 'q' from the sequence. If the character may be encoded in the first private encoding, the constructor moves on to the next character. For example, the string constructor may determine that the character 'q' may be encoded in Latin-1. Thus, the string constructor proceeds to inspect the character 'w'. If the constructor determines that at least one character cannot be encoded in the first private encoding (decision 606), the string constructor configures the string to use a second private encoding (operation 608). For example, a string constructor that receives the character sequence "qw Д rty" may inspect characters until it reaches the character 'Д', where it determines that the character 'Д' cannot be encoded in Latin-1 without loss of information. In this case, the string constructor may select UTF-16 to be the string's private encoding. If the constructor determines that all characters can be encoded using the first private encoding, the constructor selects the first private encoding (operation 610). For example, the string constructor that receives the string "qwerty" may inspect every character in "qwerty" and determine that all of the characters may be encoded in Latin-1. The string constructor then selects Latin-1 to serve as the string's private encoding. The string constructor then proceeds to finish constructing the string object (see FIG. 5).

In some embodiments, the string constructor may consider any number of character encodings to serve as the string's private encoding. For example, the string constructor may attempt to determine whether a single-byte encoding can be used. If not, the string constructor may then determine whether a two-byte encoding can be used. If not, the string constructor may configure the string to use a four-byte encoding as its private encoding.

Figure 7:
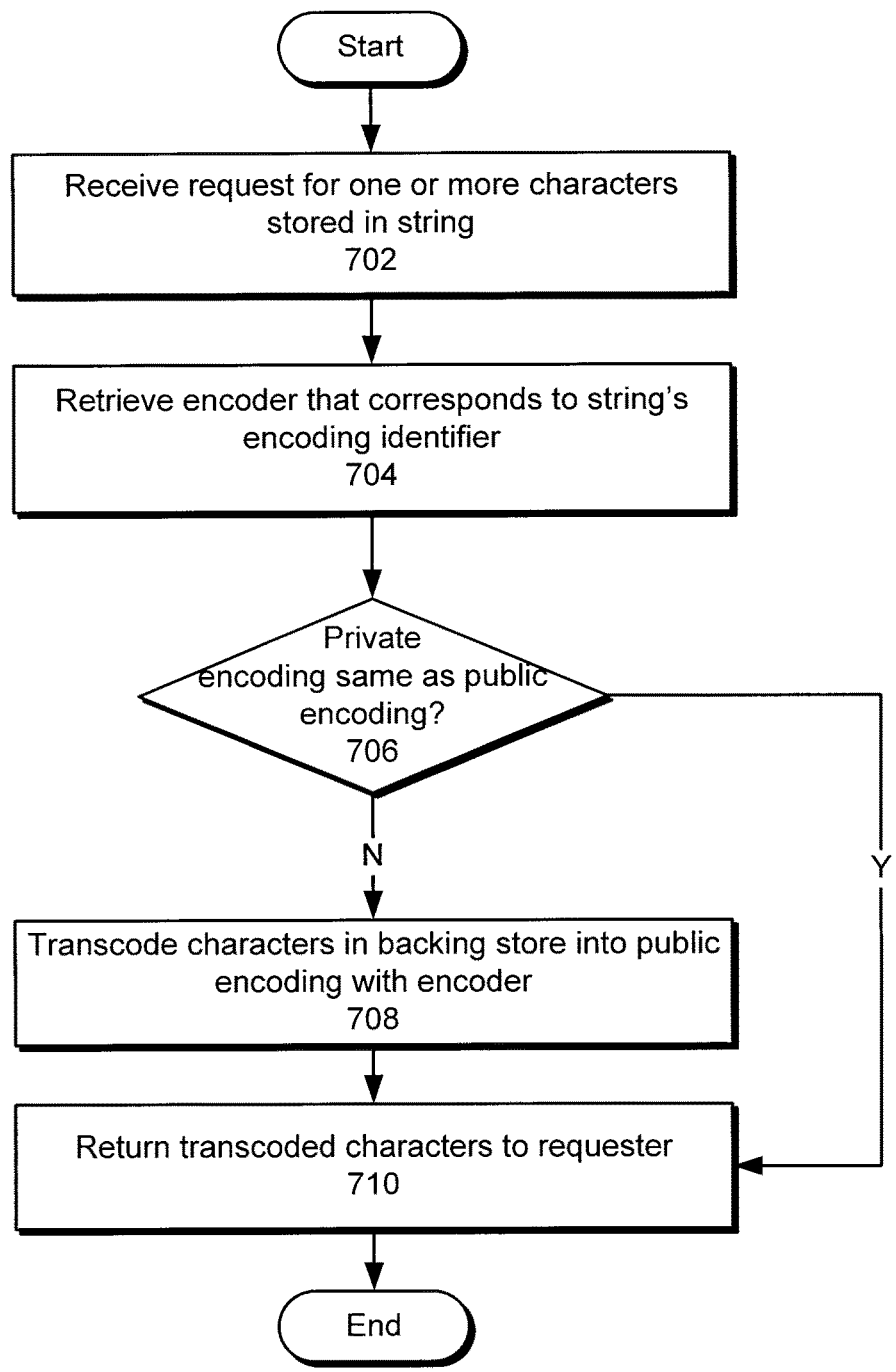
FIG. 7 shows a flowchart illustrating an exemplary process of the extracting of characters from a string in accordance with the disclosed embodiments.

FIG. 7 shows a flowchart illustrating an exemplary process of extracting characters from a string in accordance with the disclosed embodiments. In one or more embodiments, one or more of the steps may be omitted, repeated, and/or performed in a different order. Accordingly, the specific arrangement of steps shown in FIG. 7 should not be construed as limiting the scope of the embodiments.

Extracting characters from a string to return to a string consumer may involve several steps. The string consumer may invoke a public method of the string to retrieve its characters in a character array (operation 702). For example, a routine within the software program may invoke the getChars method to obtain the string's characters in the form of a char array. The method may use the encoding identifier of the string to access the encoder associated with the string's private encoding (operation 704). For example, if the string's encoding identifier has a byte value of 0x00, the method may obtain the single-byte encoder. If the string's private encoding is different from the public encoding (decision 706), the method may invoke the encoder's decode method to transcode the characters stored in the backing store from the private encoding to the public encoding (operation 708). For example, if the public encoding is UTF-16 and the string's private encoding is Latin-1, the method may invoke the single-byte encoder's decode method to transcode the characters "qwerty" from Latin-1 to UTF-16 (i.e., decompress the characters from a single-byte encoding to a two-byte encoding). If the string's private encoding is the same as the public encoding (decision 706), the method may omit the transcoding step. The method may then return the transcoded characters to the string consumer (operation 710).

In some embodiments, a software program may use UTF-16 as its public encoding while strings of the software program have access to a number of single-byte encodings that each correspond to a different coded character set. If the software program creates a string with one or more complex characters, the string constructor may (1) find a single-byte encoding that is able to represent both the simple characters and the complex characters contained in the string and (2) choose that single-byte encoding to be the string's private encoding. For example, if the software program attempts to create a string with one or more Cyrillic characters, the string's constructor may choose a single-byte encoding that provides code units for Cyrillic characters as the string's private encoding. This may enable a string to be densely stored even if the string contains complex characters.

In some embodiments, a string that is created from a sequence of characters that includes both simple and complex characters may be broken up into multiple substrings, wherein each substring contains exclusively simple characters or complex characters. For example, an array that includes a sequence of 100 simple characters, followed by a single complex character, and followed by a sequence of 50 simple characters, may be broken up into three substrings, wherein the first substring includes the sequence of 100 simple characters encoded in Latin-1, the second substring includes the single complex character encoded in UTF-16, and the third substring includes the sequence of 50 simple characters encoded in Latin-1. In other words, the string may choose, as it's private encoding, a combination of a single-byte encoding and a multi-byte encoding (i.e. the combination encoding). The string's encoding identifier may be set to a byte value that corresponds to the combination encoding. Thus, the combination encoding may provide the advantage of allowing long strings that contain mostly simple characters interspersed with relatively few complex characters to be stored efficiently. In some embodiments, the substrings of the string correspond to internal string objects that are referenced by the string. In some embodiments, references to the substrings may be stored within the bytes of the string's backing store. Additionally, the software program may specify a threshold that a string's length should surpass before the string may use the combination encoding as its private encoding. For example, a string may be broken up into substrings only if the length of the string exceeds 1000 characters. In another example, a string may be broken up into substrings only if the string contains a sequence of simple characters that exceeds 1000 characters. In some embodiments, this threshold may be specified by a user of the software program.

In some embodiments, the encoding identifier field may expedite certain string operations. Examples of string operations that may be expedited include (1) string comparison operations like the equals method; and (2) string matching operations like the matches method.

Figure 8:
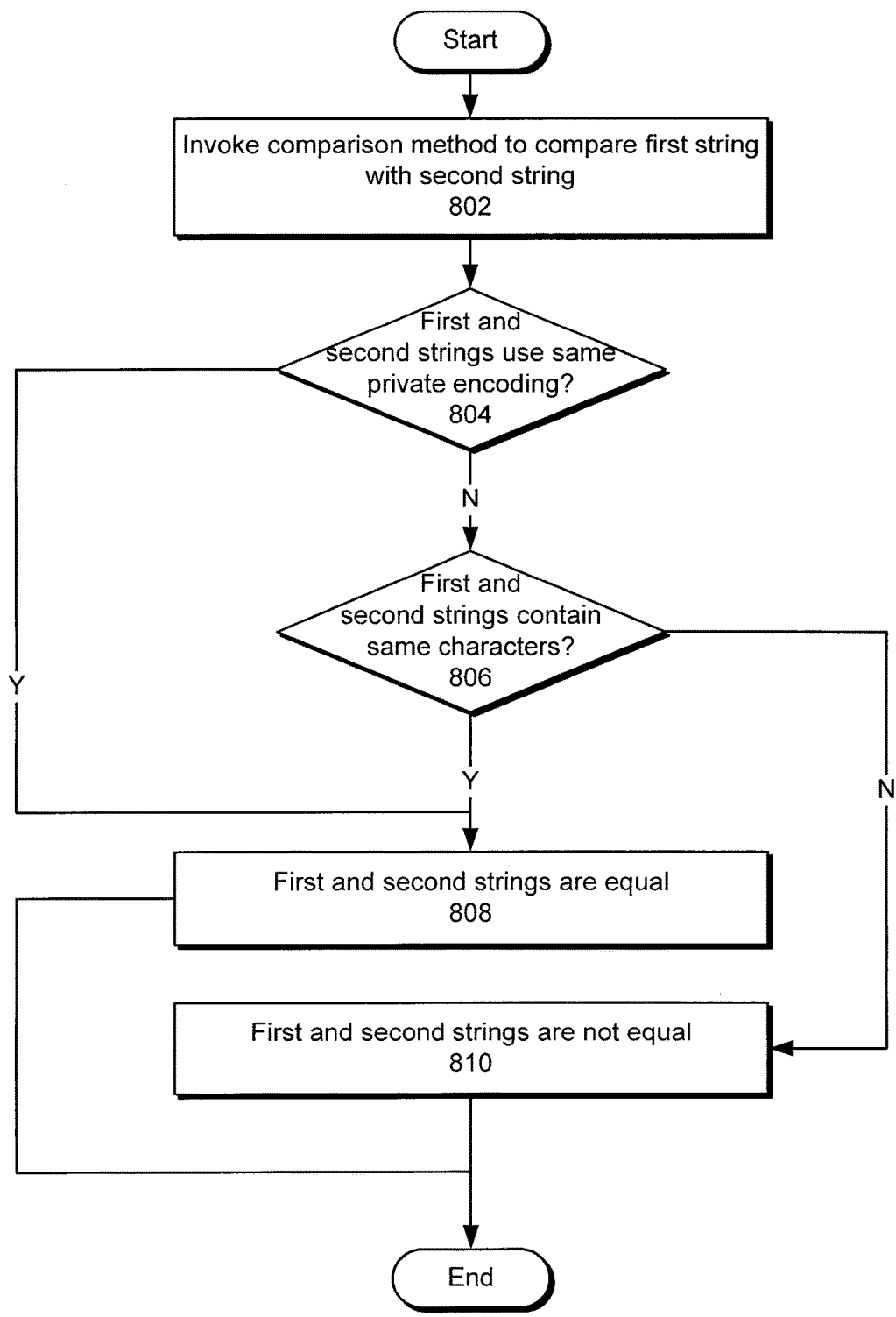
FIG. 8 shows a flowchart illustrating an exemplary process of comparing strings in accordance with the disclosed embodiments.

FIG. 8 shows a flowchart illustrating an exemplary process of comparing strings in accordance with the disclosed embodiments. In one or more embodiments, one or more of the steps may be omitted, repeated, and/or performed in a different order. Accordingly, the specific arrangement of steps shown in FIG. 8 should not be construed as limiting the scope of the embodiments.

Comparing a first string with a second string often involves comparing characters of the first string with characters of the second string. However, comparing the encoding identifiers of the strings may allow this step to be skipped. As shown in FIG. 8, the software program may compare a first string with a second string by invoking a comparison method (operation 802). For example, a string consumer may call the equals method on the first string to determine whether the first string and the second string encapsulate identical character sequences, wherein the first string is "qwerty" and the second string is "qw Д rty." Next, the method may compare the first string's encoding identifier with the second string's encoding identifier to determine whether the first and second strings use the same private encoding (decision 804). If the first and second strings use the same private encoding, the method may assume that one of the two strings includes a character that the other string does not possess. Thus, without inspecting the characters of either string, the method may conclude that the first and second strings are not equal (operation 810). For example, because the first string contains only simple characters, the string may use a single-byte encoder. Meanwhile, the second string may use a two-byte encoder due to its inclusion of a Cyrillic character. Thus, because the two strings have different encoders, the equals method can determine through a comparison of the strings' encoding identifiers that "qwДrty" contains a character not found in "qwerty" and conclude that the two strings are not equal. Alternatively, if the method determines that the two strings share the same encoder (operation 804), the method may compare the characters of the first string to the characters of the second string and determine whether the two strings share identical sequences of characters (decision 806). If the two strings share identical sequences of characters, the strings are equal (operation 808). Otherwise, if the two strings do not share identical sequences of characters, the method may conclude that the two strings are not equal (operation 810).

Figure 9:
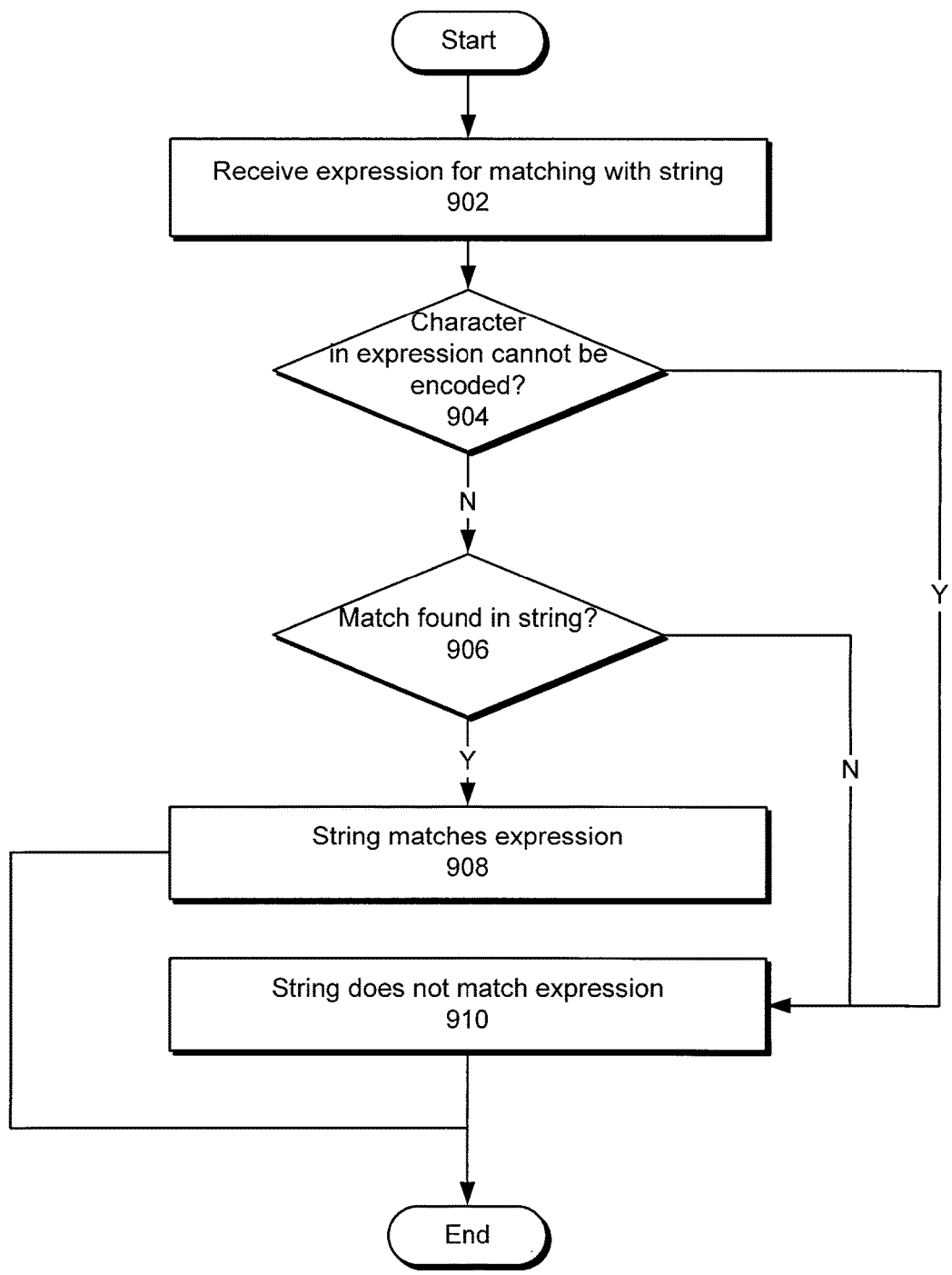
FIG. 9 shows a flowchart illustrating an exemplary process of matching an expression against a string in accordance with the disclosed embodiments.

FIG. 9 shows a flowchart illustrating an exemplary process of matching a string against an expression in accordance with the disclosed embodiments. In one or more embodiments, one or more of the steps may be omitted, repeated, and/or performed in a different order. Accordingly, the specific arrangement of steps shown in FIG. 9 should not be construed as limiting the scope of the embodiments.

Matching a string against a regular expression generally involves examining the string's characters and characters contained in the regular expression. A regular expression contains a sequence of characters that defines a search pattern. Like strings, a regular expression may include simple characters and/or complex characters. Methods associated with regular expression matching may include, among others, the "matches" method, the "regionMatches" method, the "replace" method, the "split" method, and the "startsWith" method.

As shown in FIG. 9, a public method that involves matching a regular expression may be invoked by a string consumer. The method receives a regular expression for matching against the string (operation 902). Next, the method determines whether the regular expression contains a character that may not be encoded in the string's private encoding (decision 904). If the regular expression contains a character that may not be encoded in the string's private encoding, the method may conclude that the string does not match the regular expression (operation 910). For example, the string consumer may invoke the matches method on the string "qwerty" with the regular expression "*wДr*". The method may determine that because the character 'Д' cannot be encoded in a single-byte encoding, the string does not match the regular expression. Alternatively, if the method does not find a character in the regular expression that cannot be encoded in the string's private encoding, the method then attempts to match the regular expression against the string (decision 906). If a sequence of characters that matches the regular expression is found within the string, the method may conclude that the string matches the regular expression (operation 908). If a sequence of characters that matches the regular expression is not found within the string, the string may conclude that the string does not match the regular expression (operation 910).

Figure 10:
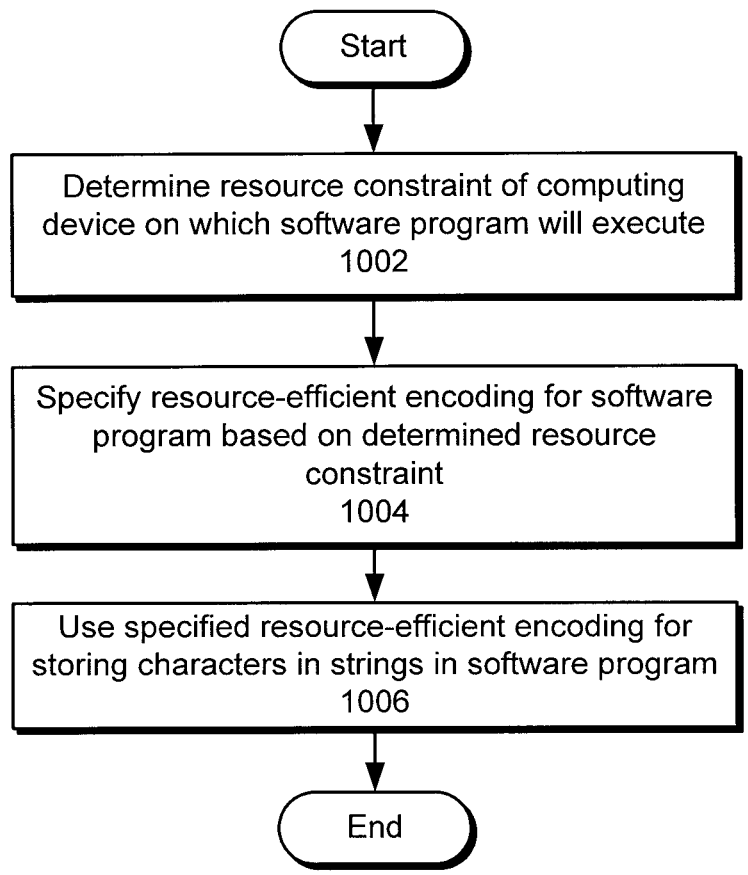
FIG. 10 shows a flowchart illustrating an exemplary process of specifying a character encoding based on a resource constraint in accordance with the disclosed embodiments.

FIG. 10 shows a flowchart illustrating an exemplary process of specifying a character encoding based on a resource constraint in accordance with the disclosed embodiments. In one or more embodiments, one or more of the steps may be omitted, repeated, and/or performed in a different order. Accordingly, the specific arrangement of steps shown in FIG. 10 should not be construed as limiting the scope of the embodiments.

Some embodiments may enable a user of the software program to specify one or more character encodings for strings to use within the software program via one or more options that may be specified during the software program's compilation and/or execution. As shown in FIG. 10, a resource constraint of the computing device on which the software program is to execute may be determined (operation 1002). Next, based on the constraint, the user may specify one or more resource-efficient encodings for the software program to use (operation 1004). The software program may then (1) use one or more of the specified resource-efficient encodings for storing characters in strings created by the software program, (2) use one of the specified resource-efficient encodings as the software program's public encoding, and/or (3) provide one or more of the resource-efficient encodings to strings to use as private encodings (operation 1006). This may allow the program to conserve the constrained resource. For example, if the software program's developer intends the software program to (1) deal with only simple characters; and (2) execute on an embedded system with a severe memory constraint, the developer may specify an option that tells the software program to use Latin-1 as its public encoding.

Figure 11:
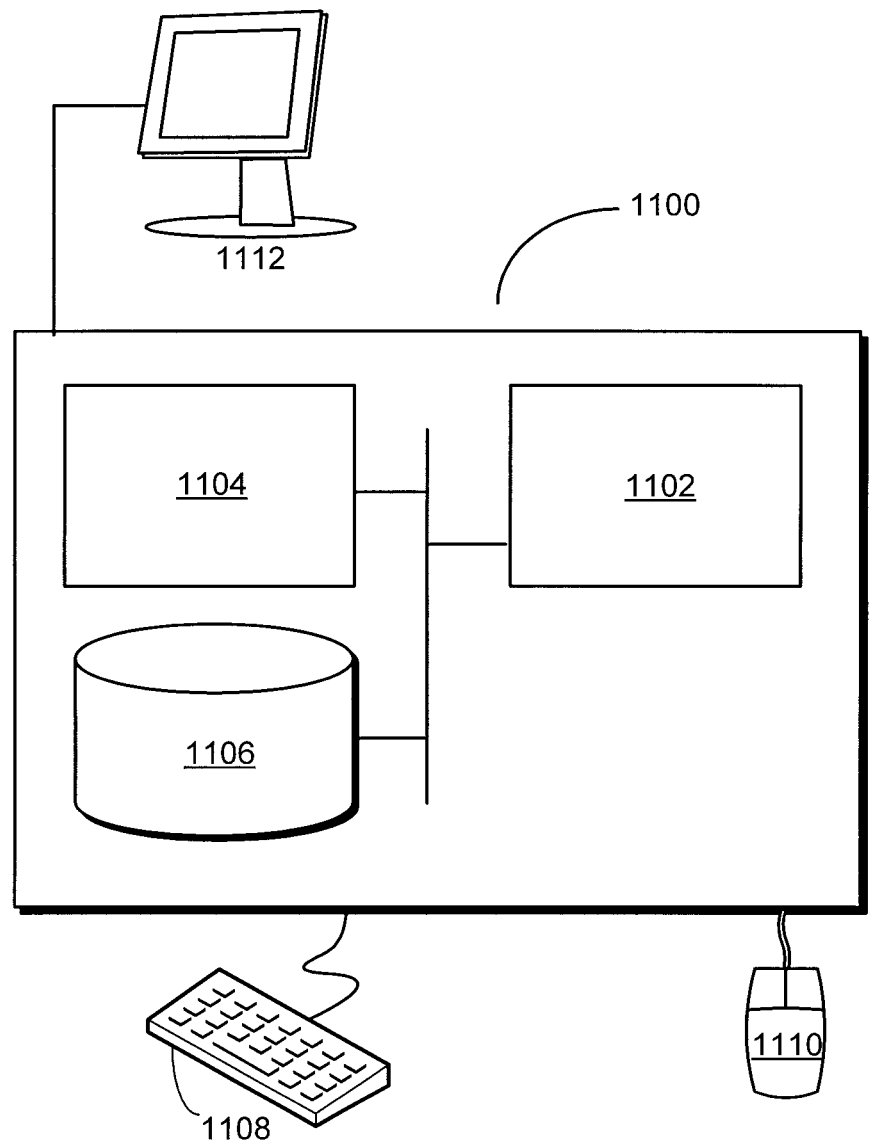
FIG. 11 shows a computer system in accordance with the disclosed embodiments.

FIG. 11 shows a computer system 1100 in accordance with an embodiment. Computer system 1100 may correspond to an apparatus that includes a processor 1102, memory 1104, storage 1106, and/or other components found in electronic computing devices such as personal computers, laptop computers, workstations, servers, mobile phones, tablet computers, and/or portable media players. Processor 1102 may support parallel processing and/or multi-threaded operation with other processors in computer system 1100. Computer system 1100 may also include input/output (I/O) devices such as a keyboard 1108, a mouse 1110, and a display 1112.

Computer system 1100 may include functionality to execute various components of the present embodiments. In particular, computer system 1100 may include an operating system (not shown) that coordinates the use of hardware and software resources on computer system 1100, as well as one or more applications that perform specialized tasks for the user. To perform tasks for the user, applications may obtain the use of hardware resources on computer system 1100 from the operating system, as well as interact with the user through a hardware and/or software linker provided by the operating system.

In one or more embodiments, computer system 1100 provides a system for densely storing strings. The system may include a storage apparatus that receives a set of input characters in a public encoding to be stored in a string. Next, the storage apparatus selects an encoding to use for storing the input characters. The storage apparatus may then set the string's encoding identifier to identify the selected encoding. Next, the storage apparatus may transcode the input characters into the selected encoding and store the transcoded input characters in the string's backing store.

The system may also include an extraction apparatus that receives a request for one or more characters stored in a string. Next, the extraction apparatus retrieves an encoder that corresponds to the string's encoding identifier. The extraction apparatus may then transcode the one or more requested characters into the public encoding with the encoder and return the one or more transcoded characters to the requester.

In addition, one or more components of computer system 1100 may be remotely located and connected to the other components over a network. Portions of the present embodiments (e.g., storage apparatus, extraction apparatus, etc.) may also be located on different nodes of a distributed system that implements the embodiments. For example, the present embodiments may be implemented using a cloud computing system that improves the knowledge and management of memory consumption in a set of remote software programs.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method, comprising:
   receiving a set of characters to be stored in a string, wherein each character is encoded using a multi-byte public encoding, which is UTF-16;
   storing the set of characters in the string at least in part by:
      determining whether every character of the set can be encoded using a first private encoding that consumes less space per character than the multi-byte public encoding, wherein a character can be encoded using the first private encoding if the first private encoding includes a code point that represents the character;
      responsive to determining that a character of the set can be encoded using the first private encoding, storing a particular value associated with the first private encoding in a particular field of the string that contains the character; and
      responsive to determining that a character of the set cannot be encoded using the first private encoding, storing a particular value associated with a second private encoding in the particular field of the string that contains the character;
   and
   responsive to a request for one or more characters stored in the string, generating a copy of the one or more characters encoded using the multi-byte public encoding at least in part by:
      determining, from a plurality of procedures associated with a plurality of candidate values for the particular field, a particular procedure associated with the particular value from the particular field; and
      using the particular procedure to decode the one or more characters from the first private encoding or the second private encoding into the multi-byte public encoding, wherein the first and second private encodings comprise at least one of UTF-8, UTF-16, UTF-32, and Latin-1.

2. The computer-implemented method of claim 1:
   wherein the set of characters are stored in a byte array field of the string; and
   wherein the particular field comprises a byte field.

3. The computer-implemented method of claim 1:
   wherein a character that is encoded in the multi-byte public encoding is represented by a plurality of bytes;
   wherein a character that is encoded in the first private encoding is represented by at most a single byte; and
   wherein a character that is encoded in the second private encoding is represented by a plurality of bytes.

4. The computer-implemented method of claim 2:
   wherein the particular value assigned to the byte field maps to a static object representation of the first private encoding; and
   wherein the static object representation provides the particular procedure.

5. The computer-implemented method of claim 2, wherein the request for the one or more characters stored in the string comprises at least one of:
   retrieving the one or more characters from the string as one or more chars;
   concatenating the string with another string to form a new string;
   obtaining a substring from the string; and
   replacing one or more other characters in the string to form a new string.

6. The computer-implemented method of claim 2, wherein determining whether the string is equal to another string comprises:
   prior to comparing the byte array field of the string to a byte array field of the other string, determining that the string is not equal to the other string based at least in part on determining that the particular field of the string and a particular field of the other string are not equal.

7. The computer-implemented method of claim 2, wherein determining whether the string matches an expression comprises:
   prior to determining whether the byte array field matches the expression, determining that the string does not match the expression based at least in part on determining that the expression comprises a character that cannot be encoded using the private encoding associated with the particular value stored in the particular field of the string.

8. The computer-implemented method of claim 1,
   wherein the string is a first substring of another string, and wherein the other string comprises the first substring encoded using the first private encoding and a second substring encoded using the multi-byte public encoding.

9. An apparatus, comprising:
   one or more processors; and
   memory storing instructions that, when executed by the one or more processors, cause the apparatus to:
      receive a set of characters to be stored in a string, wherein each character is encoded using a multi-byte public encoding, which is UTF-16;
      store the set of characters in the string at least in part by:
         determining whether every character of the set can be encoded using a first private encoding that consumes less space per character than the multi-byte public encoding, wherein a character can be encoded using the first private encoding if the first private encoding includes a code point that represents the character;
         responsive to determining that a character of the set can be encoded using the first private encoding, storing a particular value associated with the first private encoding in a particular field of the string that contains the character; and
         responsive to determining that a character of the set cannot be encoded using the first private encoding, storing a particular value associated with a second private encoding in the particular field of the string that contains the character;
         and
      responsive to a request for one or more characters stored in the string, generate a copy of the one or more characters encoded using the multi-byte public encoding at least in part by:

determining, from a plurality of procedures associated with a plurality of candidate values for the particular field, a particular procedure associated with the particular value from the particular field; and using the particular procedure to decode the one or more characters from the first private encoding or the second private encoding into the multi-byte public encoding, wherein the first and second private encodings comprise at least one of UTF-8, UTF-16, UTF-32, and Latin-1.

10. The apparatus of claim 9,
wherein the set of characters are stored in a byte array field of the string; and
wherein the particular field comprises a byte field.

11. The apparatus of claim 9,
wherein a character that is encoded in the multi-byte public encoding is represented by a plurality of bytes;
wherein a character that is encoded in the first private encoding is represented by at most a single byte; and
wherein a character that is encoded in the second private encoding is represented by a plurality of bytes.

12. The apparatus of claim 10,
wherein the particular value assigned to the byte field maps to a static object representation of the first private encoding; and
wherein the static object representation provides the particular procedure.

13. The apparatus of claim 10, wherein the request for the one or more characters stored in the string comprises at least one of:
retrieving the one or more characters from the string as one or more chars;
concatenating the string with another string to form a new string;
obtaining a substring from the string; and
replacing one or more other characters in the string to form a new string.

14. The apparatus of claim 10, wherein determining whether the string is equal to another string comprises:
prior to comparing the byte array field of the string to a byte array field of the other string, determining that the string is not equal to the other string based at least in part on determining that the particular field of the string and a particular field of the other string are not equal.

15. The apparatus of claim 10, wherein determining whether the string matches an expression comprises:
prior to determining whether the byte array field matches the expression, determining that the string does not match the expression based at least in part on determining that the expression comprises a character that cannot be encoded using the private encoding associated with the particular value stored in the particular field of the string.

16. One or more non-transitory computer-readable storage media storing instructions that when executed by a computer cause the computer to perform a method, the method comprising:
receiving a set of characters to be stored in a string, wherein each character is encoded using a multi-byte public encoding, which is UTF-16;
storing the set of characters in the string at least in part by:
determining whether every character of the set can be encoded using a first private encoding that consumes less space per character than the multi-byte public encoding, wherein a character can be encoded using the first private encoding if the first private encoding includes a code point that represents the character;
responsive to determining that a character of the set can be encoded using the first private encoding, storing a particular value associated with the first private encoding in a particular field of the string that contains the character; and
responsive to determining that a character of the set cannot be encoded using the first private encoding, storing a particular value associated with a second private encoding in the particular field of the string that contains the character;
and
responsive to a request for one or more characters stored in the string, generating a copy of the one or more characters encoded using the multi-byte public encoding at least in part by:
determining, from a plurality of procedures associated with a plurality of candidate values for the particular field, a particular procedure associated with the particular value from the particular field; and
using the particular procedure to decode the one or more characters from the first private encoding or the second private encoding into the multi-byte public encoding, wherein the first and second private encodings comprise at least one of UTF-8, UTF-16, UTF-32, and Latin-1.

\* \* \* \* \*